United States Patent [19]

Fenton

[11] 4,076,911

[45] * Feb. 28, 1978

[54] ETHYLENE-CARBON MONOXIDE COPOLYMERS

[75] Inventor: Donald M. Fenton, Anaheim, Calif.

[73] Assignee: Union Oil Company of California, Brea, Calif.

[*] Notice: The portion of the term of this patent subsequent to Sep. 22, 1987, has been disclaimed.

[21] Appl. No.: 628,643

[22] Filed: Nov. 5, 1975

[51] Int. Cl.$^2$ .............................................. C08F 4/26
[52] U.S. Cl. .............................. 526/11.1; 260/533 A; 260/539 R; 260/597 T; 526/120; 526/135; 526/172
[58] Field of Search ................. 526/11.1; 260/533 A, 260/539 R, 597 T

[56] References Cited

U.S. PATENT DOCUMENTS

| | | | |
|---|---|---|---|
| 2,507,568 | 5/1950 | Hanford et al. | 526/352 |
| 3,530,109 | 9/1970 | Fenton | 526/11.1 |
| 3,573,332 | 3/1971 | Fenton | 260/408 |

FOREIGN PATENT DOCUMENTS

| | | |
|---|---|---|
| 389,861 | 6/1963 | Japan. |
| 1,209,725 | 10/1970 | United Kingdom. |
| 1,081,304 | 8/1967 | United Kingdom. |

OTHER PUBLICATIONS

Foster et al., J. Am. Chem. Soc., vol. 78 (1956), pp. 5606–5611.
Brubaker et al., J. Am. Chem. Soc., vol. 74, (1952), pp. 1509–1515.
Lehmann et al., Chemical Abstracts, vol. 49 (1954), col. 3823e.

*Primary Examiner*—Edward J. Smith
*Attorney, Agent, or Firm*—Richard C. Hartman; Dean Sandford; Michael H. Laird

[57] ABSTRACT

Thermoplastic, soluble ethylene-carbon monoxide copolymers are produced using a $Pd(CN)_2$ catalyst in the presence of an alkanoic acid substituted by a halide group on an alpha carbon. The polymers are useful for forming films and fibers and can be incorporated in the thermoplastic, coating or adhesive compositions, e.g., in hot melts, to improve the adhesion and consistency of films prepared therefrom.

11 Claims, No Drawings

ETHYLENE-CARBON MONOXIDE COPOLYMERS

DESCRIPTION OF THE INVENTION

This is a continuation-in-part of applications Ser. No. 160,221 filed July 6, 1971 and Ser. No. 672,720 filed Oct. 4, 1967, both now abandoned.

This invention relates to a thermoplastic copolymer of ethylene and carbon monoxide and to its manufacture.

Copolymers of ethylene and carbon monoxide have been prepared using a free radical catalyst while employing moderate to superatmospheric pressures. These copolymers are disclosed by Brubaker et al in the J.A.C.S., Vol. 74, pages 1509-15. They vary in molecular weight from about 300 to 3800 and are essentially linear; fractionation of the copolymers has produced a material having a molecular weight of about 7800.

Because of their low melting points, 25°-117° C., these materials have found little use. Similar higher molecular weight copolymers have also been produced by Chatani et al as disclosed in the *Journal of Polymer Science*, 1961, Vol. 55, pages 811-819. These polyketones melt at about 185° C. and are quite brittle. They have also found little use commercially.

My U.S. Pat. No. 3,530,109 issued Sept. 22, 1970 discloses a method for producing new copolymers of lower alpha-olefins with carbon monoxide. These copolymers are essentially polyketones which form highly insoluble, cross-linked materials upon heating. While these cross-linked materials have many desirable properties, they are not thermoplastic. Furthermore, their cross-linked character renders them insoluble and this places an additional restriction upon their end use.

It is therefore an object of this invention to provide a new, high melting point, ethylene-carbon monoxide copolymer and a process for its manufacture. Another object is to provide a high melting point copolymer of ethylene and carbon monoxide which can be used to form films and fibers or which can be used as component of a hot melt composition. Other objects and advantages will be apparent from the following description and claims.

The copolymers are produced by reacting ethylene with carbon monoxide in a medium containing an alpha-substituted alkanoic acid and catalytic amounts of pallodous cyanide $Pd(CN)_2$. If desirable, reaction systems which generate or regenerate $Pd(CN)_2$ in situ may also be employed. The copolymers contain terminal carboxyl groups since the acids are incorporated as end groups to form the telomer. Thus, the polymers have the empirical formula $X(CH_2CH_2C\!=\!O)_nR$ wherein X is halo, n is from 2 to about 30, and R is a carboxylalkyl or carboxyhaloalkyl having from 2 to about 6 carbons.

The ethylene and carbon monoxide monomers polymerize on or are terminated by the alpha carbon of the acid, displacing a halo group therefrom. The displaced halo group terminates the opposite end of the copolymer molecule. Thus, the use of chloroacetic acid yields polymers having terminal chloro and carboxymethyl ($—CH_2COOH$) groups.

The polymers are usually recovered as a mixture of molecular weights representative of varying degrees of polymerization, i.e., 2 to about 30, as indicated above, and preferably between 2 and about 15. Compositions can be readily characterized by infrared and carbon-hydrogen analyses. Melting points of the various molecular weight polymers generally fall between about 150° and about 500° C.

The alpha-substituted alkanoic acid telogens include alkanoic acids which are substituted by one or more halo groups on an alpha carbon. Suitable halo groups include chlorine, bromine, fluorine or iodine. The acids have from 2 to about 6 carbons. Illustrative telogenic acids include chloroacetic acid, dichloroacetic acid, trichloroacetic acid, trifluoroacetic acid, chlorobromoacetic acid, iodoacetic acid, difluoroacetic acid, 2-chloropropionic acid, 2,2-dichloropropionic acid, 2,3-dibromopropionic acid, 2,2,3-trifluoropropionic acid, 2,2-diiodobutyric acid, 2-chloro-3,4-difluorobutyric acid, 2-chlorovaleric acid, 2,2-dichloro-4-bromovaleric acid, 2,2-dichlorohexanoic acid, 2,2-difluorohexanoic acid. Of the aforementioned acids, the substituted acetic acids are preferred because of their greater reactivity.

The acids can be used as the entire reaction medium for the polymerization or, if desired, some of the reaction medium can comprise a suitable inert solvent. Illustrative solvents include ketones, ethers or esters which can be included in amounts to about 90 percent of the reaction solution. Both alkyl and aryl ketones can be used such as acetone, methylethyl ketone, dipropyl ketone, ethyl-n-butyl ketone, cyclohexanone, dibutyl ketone, etc. Suitable ethers include dipropyl ether, di-n-butyl ether, ethylene glycol dibutyl ether, methyl o-tolyl ether, diamyl ether, dichloroethyl ether, ethylene glycol diphenyl ether, diethylene glycol di-n-hexyl ether, tetraethylene glycol dimethyl ether, and the like.

Illustrative of suitable esters are ethyl formate, methyl acetate, n-propyl formate, isopropyl acetate, ethylene glycol diacetate, glycol diformate, cyclohexyl acetate, furfuryl acetate, isoamyl n-butyrate, isoamyl isovalerate, diethyl malonate, valerolactone, methyl salicylate, n-propyl benzoate, diisoamyl phthalate, benzyl benzoate, n-dibutyl phthalate, etc.

Polymerization temperatures range from about 50° to about 205° C., preferably from about 90° to about 125° C. The palladium cyanide is used in catalytic quantities, i.e., 0.01 to about 5 weight percent of the polymerization zone contents. Concentrations between 0.1 and 2 percent are preferred. Pressures can range from the minimum necessary to maintain liquid phase to those sufficiently high to achieve an appreciable solubility of the gaseous monomers in the reaction medium and increase polymerization rate. Thus, the reaction pressure can be from about 1 to about 1000 atmospheres, preferably from about 20 to about 200 atmospheres and, most preferably, 47 to 67 atmospheres. If desired, various inert gases such as nitrogen, carbon dioxide or propane can be used to increase the pressure of the reactants.

The ethylene/carbon monoxide ratio may be varied from about 1/5 to about 5/1, preferably from 2/3 to about 7/3, the most preferred ratio being 1/1. Reaction temperature influences product properties to the extent that relatively low temperatures within the aforementioned ranges yield higher molecular weight products. The period of time for adequate polymerization is variable and depends, to a great extent, on reactor design. Reaction periods of 1/2 to about 24 hours are typical with about 1 to about 6 hours being preferred.

The polymerization can be performed in conventional batch or continuous solution polymerization equipment. Pressure vessels or autoclaves of steel, titanium, tantalum, etc., can be used or the vessels can be lined with these or similr corrosion resistant materials.

In batch polymerization, the reaction medium can be charged to the polymerization reactor along with the necessary amounts of the catalyst. The gaseous reactants are then pressured into the reactor, preferably after purging the reactor vapor space several times with the reactants to eliminate any oxygen or other gaseous contaminants which can inhibit the polymerization. The polymerization can be performed at a constant pressure of the ethylene and/or carbon monoxide monomers or can be varied throughout the run. Constant pressures are preferred.

The polymers can be recovered as solids by filtration or evaporation of the reaction medium. The reaction solvent can be mixed with 0.1 to 10 volumes of water per volume of solvent to insure the complete polymer precipitation and recovery. The polymers can also be extracted with suitable solvent such as ketones or esters. Solutions of the polymers can be used to form films or fibers by the application of the solution as a thin film to a substrate and evaporation of the solvent to deposit the polymer film. The products are thermoplastic and have high melting points, e.g., within the range of about 200° to 450° C. and therefore can be used in high temperature applications. They may also be consolidated into various articles such as moldings, gaskets, etc. and will retain their shape at high temperatures. Alternatively, the materials can be melted and mixed into hot melt compositions such as those prepared from mixtures of paraffin wax and ethylene vinyl acetate copolymers such as the various Elvax products. A typical hot melt composition might contain 40 to 55 weight percent hard paraffin wax, 5 to 20 weight percent microcrystalline wax, 10 to 30 weight percent ethylenevinyl acetate copolymer, and 15 to 25 weight percent of the polymer of Example 3.

The following examples illustrate methods for copolymerizing and telomerizing ethylene and carbon monoxide with the various alpha-substituted alkanoic acids.

EXAMPLE 1

Into a tantalum lined steel rocking bomb were placed 0.5 gram Pd(CN)$_2$, 2 grams mercuric cyanide and 45 ml dichloroacetic acid. The bomb was pressured to 400 psi with ethylene and then to 1000 psi with carbon monoxide. This mixture was maintained at 110° C. for 6 hours. A black solid weighing 9 grams was obtained by filtering the reaction mixture. The filtrate was then mixed with 300 ml water from which 4 grams of a tan solid precipitated. The precipitated solid had a melting point exceeding 300° C. The infrared spectrum of the acid soluble fraction showed both ketonic and carboxylic carbonyl bands.

EXAMPLE 2

A titanium bomb was loaded with 0.5 gram Pd(CN)$_2$ and 75 ml dichloroacetic acid. The bomb was pressured with ethylene to 700 psi and then with carbon monoxide to 1000 psi. The mixture was maintained at 90° C. for 6 hours. There was obtained 7 grams of a solid whose infrared spectrum indicated ketonic carbonyl groups, but no acid. The solid was filtered from the acid and water was added to the filtrate to precipitate 9 grams of a dark viscous mass. The infrared spectrum of the water insoluble mass showed acidic and ketonic carbonyl groups as well as carbon-chlorine bonding. Carbon-hydrogen analysis was consistent with the structure

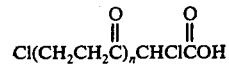

with an average value of $n=3$. The acid fraction had a melting point above 300° C. and was also soluble in acetone and in 10 percent aqueous NaOH.

EXAMPLE 3

The titanium bomb was loaded with 0.5 gram Pd(CN)$_2$, 25 grams chloroacetic acid and 75 ml acetic acid. The bomb was pressured to 400 psi with ethylene and to 800 psi with carbon monoxide. The mixture was then maintained at 120° C. for 6 hours with agitation. An acid insoluble fraction of 8 grams and a water insoluble fraction of 1 gram were obtained. The water insoluble fraction had an infrared spectrum showing ketonic and carboxylic bands. Analysis indicated the basic structure to be

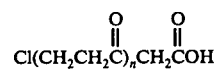

with an average value for $n$ of 10.

EXAMPLE 4

A 300 ml steel rocking bomb was loaded with 0.5 gram Pd(CN)$_2$ and 100 ml dichloroacetic acid. The bomb was pressured to 500 psi with ethylene and then to 1000 psi with carbon monoxide. This mixture was hated at 125° C. with rocking for 6 hours during which time the pressure dropped to 350 psi. Three grams of a black solid were filtered from the acid. The filtrate was concentrated by distillation to obtain a viscous solution containing solids having the formula Cl(CH$_2$CH$_2$C=O)$_n$CHClCOOH wherein $n$ was about 2 to 15. This solution was then extracted successively with 200 ml portions of a variety of solvents to extract a total of 13 grams of the solids. The results are tabulated below:

Table

| Solvent | Weight Extracted, g. | Melting Point of Solid Extracted |
| --- | --- | --- |
| Benzene | 2 | 155° C. |
| Chloroform | 5 | 240° C. |
| Acetic acid | 2 | Above 350° C. |
| Acetone | 3 | Above 350° C. |
| Water | 1 | Above 350° C. |

All the solids showed intense carbonyl and hydroxyl bands under infrared analysis.

EXAMPLE 5

A tantalum bomb was charged with 50 ml trifluoroacetic acid and 0.33 gram palladium cyanide. The bomb was then pressured to 400 psig with ethylene and then to 800 psig with carbon monoxide. The resulting mixture was then heated at 100° C. for 6 hours while rocking the bomb. The final pressure had dropped to 650 psig. The bomb contents were removed and filtered and a black solid was recovered which was washed and analyzed to find that it contained ketonic and carboxylic carbonyl groups.

EXAMPLE 6

Similar ethylene-carbon monoxide copolymerization products can be prepared from 2,2-dichloro-n-butanoic acid by charging a 300 ml steel rocking bomb with 0.5 gram Pd(CN)$_2$, 50 ml 2,2-dichloro-n-butanoic acid and 50 ml acetic acid diluent and pressuring to 400 psi with ethylene and then to 800 psi with carbon monoxide. The reactor contents are then heated to and maintained at a temperature of 125° C. for 6 hours with agitation. The bomb can then be depressured and the product recovered by filtering the product polymer from the liquid phase.

I claim:

1. The process of producing a high melting point, thermoplastic telomer of ethylene and carbon monoxide having a number of repeating monomeric units within the range of 2 to about 30, which process comprises reacting ethylene and carbon monoxide in a liquid medium containing an alkanoic acid having from 2 to about 6 carbons and bearing at least one halo group on an alpha carbon under reaction conditions including a temperature of about 50° to about 205° C. and a pressure of about 1 to about 200 atmospheres, in the presence of palladium cyanide, the initial ratio of ethylene to carbon monoxide being about 1/5 to about 5/1, sufficient to produce said high melting point, thermoplastic telomer.

2. The method of claim 1 wherein the number of said repeating monomeric units of said telomer is in the range of 2 to about 15.

3. The method of claim 1 wherein said ratio of ethylene to carbon monoxide is within the range of about 2/3 to about 7/3 and said alkanoic acid is acetic acid having at least 1 halo group on the alpha carbon atom.

4. The method of claim 1 which comprises reacting said ethylene and carbon monoxide under said reaction conditions sufficient to produce said telomer having a melting point within the range of about 200° to about 450° C.

5. The method of claim 1 wherein said halo group is selected from the group consisting of chloro and fluoro.

6. The thermoplastic ethylenecarbon monoxide copolymer having the empirical formula

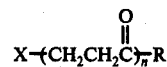

wherein X is halo, $n$ is a value between 2 and about 30 and R is selected from the group consisting of carboxyalkyl and carboxyhaloalkyl having from 2 to about 6 carbons.

7. The copolymer of claim 6 wherein $n$ is a value between 2 and about 15.

8. The copolymer of claim 6 wherein said R is selected from the group consisting of carboxymethyl and carboxyhalomethyl.

9. The thermoplastic copolymer of claim 6 wherein said X is selected from the group consisting of chloro and fluoro.

10. The composition comprising a telomer of ethylene and carbon monoxide having a melting point within the range of about 200° to about 450° C. and the empirical formula

wherein X is halo, $n$ is a value between 2 and about 30 and R is selected from the group consisting of carboxyalkyl and carboxyhaloalkyl having from 2 to about 6 carbons.

11. The telomer produced by the method of claim 1 characterized by repeating ethylene and carbon monoxide monomer units and having terminal halo groups at one end and terminal groups at the other end selected from the group consisting of carboxyalkyl and carboxyhaloalkyl radicals.

* * * * *